Dec. 10, 1963     D. J. FYVIE     3,113,363
FISHING ROD CLAMPING APPARATUS
Filed March 28, 1960

*INVENTOR.*
DONALD J. FYVIE
BY
ATTORNEYS

United States Patent Office 3,113,363
Patented Dec. 10, 1963

3,113,363
FISHING ROD CLAMPING APPARATUS
Donald J. Fyvie, 311 E. Harrie St., Newberry, Mich.
Filed Mar. 28, 1960, Ser. No. 17,990
3 Claims. (Cl. 24—257)

This invention relates to clamping apparatus and more particularly to clamping devices that are capable of releasably clamping in parallel, side-by-side relation a plurality of rod sections which normally are adapted to be arranged and fixed one to another in end-to-end relation to form a fishing rod of substantial length, the clamping apparatus being operable to enable the rod sections of a fishing rod to be disconnected from one another without necessitating removal of the line, or reel, or hook connected to the free end of the line.

A great many of the casting and fly rods currently in use are composed of two or more rod sections which may be removably joined one to another in end-to-end relation to form a fishing rod of substantial length, the individual rod sections being capable of being separated from one another so as to permit the overall length of the rod to be reduced materially for transportation and storage. When the rod sections are disjointed from one another they heretofore have been loose and, unless the fisherman reels in the line, the line is more than likely to become snarled.

Rods of the kind in general use have associated therewith line guides or eyelets through which the line extends from one end of the rod to the other and these guides customarily are of such diameter that it is not possible to reel in the line without disconnecting the fly, hook or lure, as the case may be, from the line. Consequently, considerable time is consumed in conditioning a fishing rod for travel and a corresponding amount of time is required to condition the rod for use when it has been transported to the fishing site.

Fishing rods of the kind widely in use, in addition to being formed of a plurality of separable rod sections, taper more or less uniformly from one end to the other. Stated differently, each of the separable rod sections tapers from one end to the other and the adjoining ends of two adjacent sections have a cross-sectional area which is substantially uniform. Because of the tapering characteristics of the rods, the end or tip section of a conventional rod is relatively slender as compared to the butt rod section. Consequently, the tip section of the rod is the weakest part of the rod and is most likely to be damaged by being loose from the other parts of the rod.

An object of this invention is to provide clamping means for removably clamping the rod sections of a multiple section fishing rod in side-by-side, substantially parallel relation so as to maintain the rod sections in an assembled relation even when the individual sections are disjointed from one another.

Another object of the invention is to provide clamping means of the kind described which permits the rod sections of a multiple section fishing rod to be maintained in side-by-side relation without necessitating winding up of the line or removal of the hook, fly or lure.

A further object of the invention is to provide clamping apparatus of the character described which will function to protect the individual rod sections when clamped in side-by-side relation.

Still another object of the invention is to provide clamping apparatus of the kind referred to which is economical to manufacture, simple to use, and rugged and durable in construction.

Other objects and advantages of the invention will be pointed out specifically or will become apparent from the following description when it is considered in conjunction with the appended claims and the accompanying drawings, in which:

FIGURE 1 is a plan view illustrating a multiple section fishing rod having its rod sections disjointed from one another and maintained in parallel, side-by-side relation by clamping devices constructed in accordance with one embodiment of the invention;

FIGURES 2 and 3 are sectional views taken on the lines 2—2 and 3—3, respectively, of FIGURE 1;

FIGURE 4 is a view similar to FIGURE 1, but illustrating another embodiment of the invention;

FIGURES 5 and 6 are, respectively, sectional views taken on the lines 5—5 and 6—6 of FIGURE 4;

Figure 1:
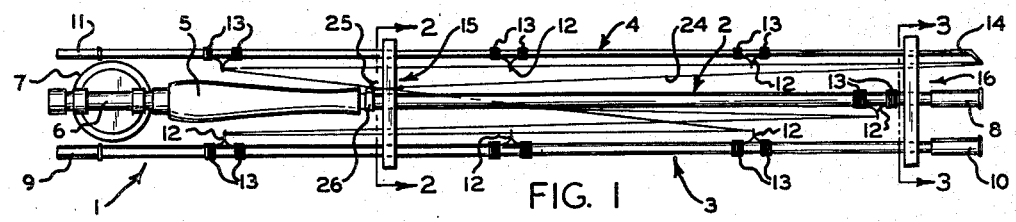
Figures 2, 3:
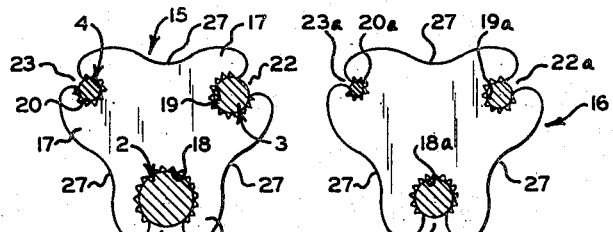

The embodiment of the invention illustrated in FIGURES 1-3 is adapted for use in conjunction with a multiple section fishing rod 1 composed of a butt rod section 2, an intermediate rod section 3 and a tip rod section 4. At one end of the butt section 2 is joined a handle 5 from which projects an extension 6 on which a reel 7 of known construction may be mounted. The other end of the butt section 2 is provided with a socket member 8 into which a plug member 9 mounted at one end of the intermediate rod section 3 may be removably fitted. The opposite end of the rod section 3 is provided with a socket member 10 into which a plug element 11 may be removably fitted, the plug 11 being joined to one end of the tip section 4. The construction of the parts described thus far is conventional and is such as to enable the rod sections 2, 3 and 4 to be removably fixed to one another in end-to-end relation so as to form a fishing rod of substantial length.

At suitably spaced intervals along each of the rod sections 2, 3 and 4 are located line guide means which, in each instance, may comprise a loop 12 formed of wire or the like having its ends lashed or otherwise suitably secured to the associated rod section by a wrapping 13 of suitable filamentary material. At the free end of the tip section 4 is a line guide 14 which is fitted over the end of the tip section.

As is customary, each of the sections 2, 3 and 4 tapers in length from end to end, the taper being in such direction that the cross-sectional area of any portion of the rod sections in a direction remote from the handle 5 is smaller than the cross-sectional area of any portion of the sections located more closely to the handle 5. As a consequence, the tip section 4 is considerably slimmer and more flexible than the butt section 2, the tip section 4 thus being somewhat weaker and more subject to being damaged than are the remaining sections.

The clamping devices disclosed in FIGURES 1, 2 and 3 adapted for use with the fishing rod 1 comprise a pair of clamping or supporting members designated by the reference characters 15 and 16. The member 15 preferably is formed of a somewhat flexible, resilient material such as polyethylene, rubber, or an equivalent substance and is so shaped as to provide a number of supporting portions 17 corresponding to the number of rod sections of the fishing rod. Each supporting section 17 is provided with an opening, the openings being designated by the reference characters 18, 19 and 20, each opening being so dimensioned as to be slightly smaller than the cross-sectional dimension of the portion of the rod section it is adapted to receive so as to enable the rod section to be gripped snugly when it is received in an opening.

Because of the taper of the rod portions, each opening in the supporting portions 17 preferably is of somewhat different size. Thus, the opening 18 is larger than the opening 19 and the latter opening is larger than the opening 20. The opening 18 consequently is adapted to receive the butt section 2, the opening 19 is adapted to receive the intermediate section 3 and the opening 20 is adapted to receive the tip section 4.

In order to facilitate reception of the rod sections in the openings of the member 15, each opening 18, 19 and 20 is slotted as at 21, 22 and 23, respectively, each slot extending from the marginal outer edge of the member 15 into its associated opening to provide a constricted throat through which a rod section may be forced for reception in the opening. If desired, the sides of the openings may be serrated.

The member 16 is the same in all respects as the member 15 with the exception that the openings in the member 16 may be made somewhat smaller than the corresponding openings in the member 15 inasmuch as the member 16 is adapted to be mounted on the butt section 2 near the end of the latter which is remote from the handle 5. Accordingly, the same reference characters used in connection with the member 15 are used for the member 16, followed by the letter "a."

When a fishing rod of the kind disclosed in FIGURE 1 is in use, the rod sections 2, 3 and 4 will be fitted one to another in end-to-end relation and a fishing line 24 having one end anchored on the reel 7 may have its other end threaded through the guides 12 and 14, with its free end provided with a hook 25 or other device. Should it become necessary or desirable to travel from one place to another and should the traveling make it desirable to reduce the overall length of the rod, the members 15 and 16 may be mounted on the butt section 2 and thereafter the rod sections 3 and 4 may be disjointed and supported on the members 15 and 16 in side-by-side, substantially parallel relation. When disassembling the rod sections from one another and assembling them on the members 15 and 16, it is not necessary to disconnect the hook 25 or other device from the line 24, nor is it necessary to reel in the line. Instead, it is only necessary to provide enough slack in the line to enable the rod sections 2, 3 and 4 to be assembled on the members 15 and 16 and, when once assembled, the hook or other device 25 may be secured at any suitable place, such as in an eyelet member 26, on any of the rod sections. When the rod sections are assembled on the members 15 and 16, portions of the line 24 may be received in the openings of the support members 15 and 16, if desired, or the line may be so distributed as to be free of the openings.

As is probably best illustrated in FIGURES 2 and 3, the rod sections 2, 3 and 4, when received in the openings of the members 15 and 16, are located inwardly of the marginal edges of the latter. Consequently, the assembled rod sections and supporting members 15 and 16 may be placed on a hard surface, or even dropped, without the rod sections themselves ever engaging the surface on which the assembly is dropped. Consequently, the rod sections are protected by the members 15 and 16. Preferably, the marginal edge of the members 15 and 16 are recessed somewhat as at 27 to prevent the assembly from rolling and also to provide recessed areas for reception of the line 24 and prevent abrading of the latter by engagement with a rough surface.

When it is desired to use the rod 1 again for fishing, it is a simple matter to disconnect the rod sections from the members 15 and 16 and once again secure the latter one to another. Because the rod sections will have been firmly clamped by the members 15 and 16, there is no possibility that the line will have become snarled. Since the hook 25 or other device was not disconnected from the line, substantial time is saved in conditioning the rod once again for use.

Figure 4:
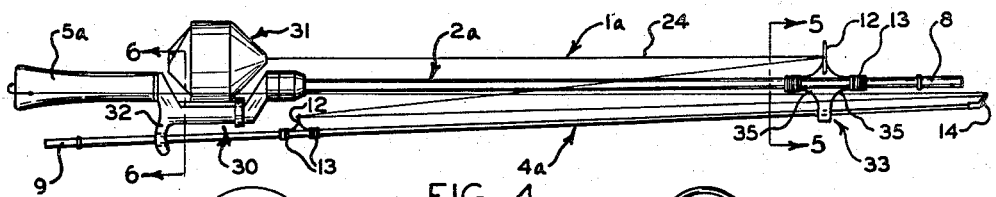

The embodiment of the invention disclosed in FIGURE 4 is illustrated for use in conjunction with a rod 1a commonly known as a casting rod and composed of a butt section 2a and a tip section 4a, the two sections tapering and being adapted to be joined one to another by means of a socket member 8 on the section 2a and a plug member 9 on the rod section 4a. The butt portion 2a is provided with a handle 5a having means of conventional construction and designated generally by the reference character 30 for mounting a reel 31 which also is of conventional construction. As is common with fishing rods of the casting type, the handle includes a portion 32 projecting laterally therefrom. In the illustrative embodiment of the invention, the part 32 comprises a finger grip, but it could be any laterally projecting part.

Means for mounting the rod portions 2a and 4a in side-by-side, substantially parallel relation comprises a clamp or support member 33 composed of a body 34 formed of material similar to that described in connection with the members 15 and 16 and having diverging flange portions 35 adapted to be placed against one of the rod sections such as the section 2a and lashed in place by the same wrapping 13 that secures one of the line guides 12. The body 34 may be provided with openings corresponding in number to the number of rod portions to be assemblied with the rod portion 2a and, since only one rod portion 4a is shown in FIGURE 4, only one opening 36 need by provided. The opening 36 communicates with a slot 37 providing a throat of reduced cross-sectional area through which the rod portion 4a may be introduced to the opening 36.

Figure 6:
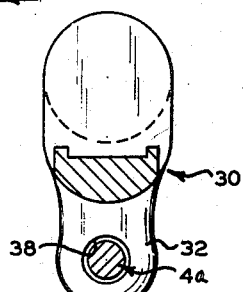
Figure 5:
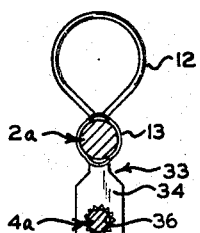

Forming part of the supporting means in the embodiment shown in FIGURES 4, 5, and 6 is an opening 38 formed in the finger piece 32. The opening 38 may be somewhat larger than the size of the rod portion 4a, but no undesirable shifting of the portion 4a will result inasmuch as the latter is gripped firmly by the walls of the body 33 defining the opening 36.

The use and operation of the apparatus disclosed in FIGURES 4, 5 and 6 is similar to the use and operation of the previously described apparatus, the principal difference being that the clamping means disclosed in FIGURES 4, 5 and 6 may form a permanent part of the rod construction.

Figure 7:
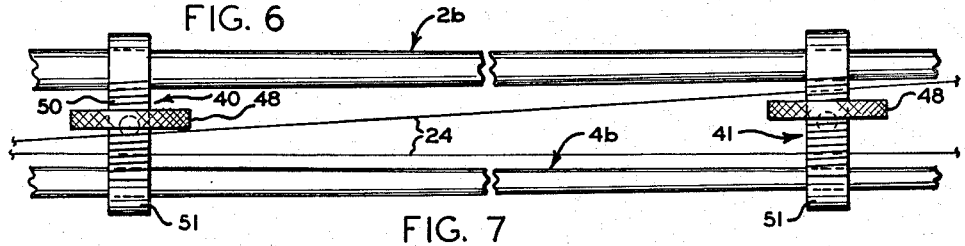
FIGURE 7 is a fragmentary, enlarged view of a pair of fishing rod sections removably clamped side-by-side by clamping apparatus formed in accordance with another embodiment of the invention.
Figure 8:
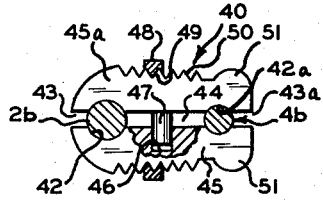
FIGURE 8 is a view, partly in elevation and partly in section, of clamping apparatus of the kind disclosed in FIGURE 7.
Figure 9:
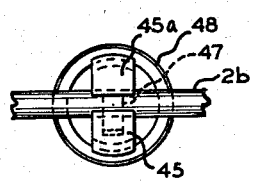
FIGURE 9 is a fragmentary, end elevation view of the apparatus shown in FIGURE 8.

FIGURES 7, 8 and 9 disclose another embodiment of the clamping means which again comprises a pair of similar clamp or support members 40 and 41. The members 40 and 41 are shown applied only to two rod sections, 2b and 4b, but the apparatus may be adapted for mounting more rod sections if desired. Each member 40 and 41 is similar, so only one will be described in detail.

The member 40 comprises a body formed of material similar to that previously disclosed and having a pair of openings 42 and 42a adapted to receive the rod portions 2b and 4b, respectively. The openings respectively communicate with slots 43 and 43a extending to the adjacent marginal wall of the member and each slot is continued in the opposite direction to form a slot 44 cutting the member 40 into two pieces 45 and 45a. Each piece 45 and 45a is provided with a blind opening, one of which is shown at 46, in which is mounted a pin 47, the pin lying athwart the slot 44 and preventing endwise relative movement of the body pieces while permitting the body pieces to move towards and away from one another.

Additional means for maintaining the body pieces assembled and for enabling the member 40 to exert a clamping force on the rod sections comprises a ring 48 having one or more threads 49 on its inner periphery engaged with threads 50 formed on the outer edges of the body portions 45 and 45a. The portions 45 and 45a are so constructed that, when correctly assembled, the member 40 tapers from one end towards the other, whereby rotation of the ring 48 in a direction to cause it to move towards the end of greater cross-sectional dimension will cause the ring to exert a force on the portions 45 and 45a to move them towards one another, thereby causing the portions to exert clamping forces on the rod sections. The clamping force may be increased by forming the openings 42 and 42a slightly smaller than the rod sections. To release the clamping force, the ring need only be turned in the opposite direction.

In order to prevent inadvertent separation of the ring from the member 40, the smaller end of the latter is enlarged as at 51 an amount sufficient to prevent the ring from slipping over the end unless considerable force is applied to it.

The use and operation of the clamping members 40 and 41 are generally similar to the use and operation of the previously described embodiments, with the exception that the rings 48 require manipulation before the rod sections may be assembled in or disassembled from side-by-side, generally parallel relation.

The disclosed embodiments are representative of presently preferred forms of the invention but are intended to be illustrative rather than definitive thereof. The invention is defined in the claims.

I claim:

1. Apparatus for use in clamping in substantially parallel, side-by-side relation a plurality of rod sections that normally are fixed one to another in end to end relation to from a fishing rod of substantial length, said apparatus comprising a clamping member formed of yieldable material and having as many openings therein as there are rod sections, each of said openings having a slot communicating therewith and extending through the adjacent marginal wall of said member to form a constricted throat through which a rod section may pass and be received in that opening, each of said openings having a dimension smaller than the corresponding dimension of the rod section it is adapted to receive whereby a rod section in any one of said openings may be yieldably squeezed by the sides thereof, said clamping member having another slot communicating with each of said openings to cut said member into a plurality of separable pieces, and an adjustable ring device encircling said pieces operable to maintain said pieces assembled and to clamp and unclamp rod sections therebetween, said pieces and said ring device having cooperating threads.

2. The construction set forth in claim 1 wherein said pieces taper toward corresponding ends whereby movement of said ring device relative to said pieces away from said ends causes said pieces to be forced toward one another.

3. The construction set forth in claim 1 wherein said clamping member includes a pin joining said pieces and lying athwart the communicating slot.

References Cited in the file of this patent

UNITED STATES PATENTS

| | | |
|---|---|---|
| 396,909 | Annin | Jan. 29, 1889 |
| 1,080,013 | Landin | Dec. 2, 1913 |
| 2,595,746 | Zinn | May 6, 1952 |
| 2,650,449 | Suring | Sept. 1, 1953 |
| 2,715,990 | Austin | Aug. 23, 1955 |
| 2,816,393 | Kmonk | Dec. 17, 1957 |
| 2,816,696 | Stockfleth | Dec. 17, 1957 |
| 2,821,762 | Foose | Feb. 4, 1958 |
| 2,954,764 | Stinson | Oct. 4, 1960 |
| 2,980,305 | Reese | Apr. 18, 1961 |